Oct. 24, 1939.                L. M. POTTS                 2,177,077
                        PHOTOELECTRIC TRANSMITTER
                        Filed Nov. 4, 1935        6 Sheets-Sheet 1

INVENTOR
LOUIS M. POTTS
BY H. B. Whitfield
ATTORNEY

Oct. 24, 1939.                    L. M. POTTS                     2,177,077
                           PHOTOELECTRIC TRANSMITTER
                            Filed Nov. 4, 1935         6 Sheets-Sheet 2

INVENTOR
LOUIS M. POTTS
BY H. B. Whitfield
ATTORNEY

Oct. 24, 1939.  L. M. POTTS  2,177,077

PHOTOELECTRIC TRANSMITTER

Filed Nov. 4, 1935   6 Sheets-Sheet 3

INVENTOR
LOUIS M. POTTS
BY *H. B. Whitfield*
ATTORNEY

Oct. 24, 1939.  L. M. POTTS  2,177,077
PHOTOELECTRIC TRANSMITTER
Filed Nov. 4, 1935   6 Sheets-Sheet 4

INVENTOR
LOUIS M. POTTS
BY H. B. Whitfield
ATTORNEY

Oct. 24, 1939.  L. M. POTTS  2,177,077

PHOTOELECTRIC TRANSMITTER

Filed Nov. 4, 1935   6 Sheets-Sheet 5

INVENTOR
LOUIS M. POTTS
BY
ATTORNEY

Oct. 24, 1939.  L. M. POTTS  2,177,077
PHOTOELECTRIC TRANSMITTER
Filed Nov. 4, 1935    6 Sheets-Sheet 6

INVENTOR
LOUIS M. POTTS
BY H.B. Whitfield
ATTORNEY

Patented Oct. 24, 1939

2,177,077

UNITED STATES PATENT OFFICE 2,177,077

PHOTOELECTRIC TRANSMITTER

Louis M. Potts, Evanston, Ill., assignor to Teletype Corporation, Chicago, Ill., a corporation of Delaware Application November 4, 1935, Serial No. 48,098

56 Claims. (Cl. 178—17)

The present invention relates to transmitters and particularly to a transmitter in which the transmission of signalling impulses is controlled through a photoelectric system.

The principal object of the invention is to control photoelectrically the transmission of permutation code signals.

Another object of this invention is to provide a photoelectric transmitter in which the timing of the impulses is determined by mechanical parts having such an arrangement, relative size, and motions that accurate signals are readily transmitted.

Another object of the invention is to sense photoelectrically material carrying permutation code impressions either in the form of perforations or printing.

A further object of the invention is to provide a photoelectric transmitter to transmit start-stop permutation code combinations of signalling impulses in which the start and stop signals are inserted by the scanning mechanism independently of the record on the control strip.

A feature of the invention is to provide a photoelectric transmitter to transmit an equal unit code and having a light shutter with an opening corresponding to each element of the code, a single source of light, a photoelectric cell, and means to control the impingement of the light on the photoelectric cell by said shutter.

The foregoing and other objects of the invention are achieved by providing a transmitting apparatus having, in one form thereof, two scanning cylinders, one inserted within the other so as to be coaxially disposed, and both adapted to rotate in the same direction but at different speeds, the inner cylinder making one complete revolution, while the outer cylinder rotates a unit angular amount equal to the distance between successive rows of perforations. Superimposed above the scanning instrumentalities is an optical system or apparatus for condensing and directing the light from the light source, and positioned between the optical system and the scanning arrangement is the control strip which is provided with transverse rows of impressions. The control strip may take the form of a perforated tape, or the tape may be of translucent material having the code signals imprinted thereon. Tape sensing is achieved by photoelectric means, a photoelectric cell which is located within the inner cylinder being responsive to the light rays from the source of light within the optical system, which is exterior to said cylinders. The presence or absence of the impressions in the control strip is sensed sequentially by the photocell and a transmitting relay is correspondingly actuated thereby through suitable amplifying means.

Among the features of the invention is the timing of the start and stop impulses photoelectrically, and transmitting the start and stop impulses photoelectrically independently of perforations in the tape or impressions on the control strip. In the form of the invention employing the two coaxially disposed scanning cylinders, the outer cylinder is provided with a plurality of circumferential rows of holes corresponding to the signal hole or code positions on a perforated tape. The outer cylinder is also provided with a circumferential row of feed pins corresponding to the characteristic row of feed holes in the tape. The row of holes and feed pins are in alignment both circumferentially and axially of the cylinder so that if a strip of tape perforated with so-called rub-out signals were wrapped around the outer cylinder, the feed pins on the cylinder would protrude through the feed-holes in the tape, and the perforations in the tape would coincide with the apertures in the cylinder. In addition to said plurality of circumferential rows of holes and spaced therefrom is an extra row of holes. The space defined between the extra row of holes and the plurality of rows does not have corresponding holes in the tape but is utilized to effect the transmission and to control the timing of the start signals. As will become apparent hereinafter, the timing of the start and stop impulses is governed or controlled by said space and said extra row of holes, respectively.

According to the present invention, the length of the impulse intervals is governed by the length of the slots in the inner cylinder, said slots being helically arranged around the cylinder and spaced to coincide each with a circumferential row of perforations in the outer cylinder. In this manner a slot is provided corresponding to each element of a complete code signal, the control tape acting to determine the character of each impulse. It is contemplated to impart to the tape a continuous movement in contradistinction to the familiar step-by-step movement, and to compensate for this movement of the tape, a fixed shutter or plate is interposed between the outer cylinder and the tape and is provided with a diagonally arranged series of narrow slots. With this arrangement, it is possible to transmit a plurality of elementary signal impulses photo-electrically in the interval of time during which the control tape moves the distance between two consecutive rows of holes in the longitudinal direction of the tape. A feature of the invention resides in the provision of a single light source and photoelectric cell which is common to all of the elements of the code, and the accurate control of the impingement of the beam of light on the photocell. To achieve this result only the middle portion of the usually circular perforation is utilized to admit light, thus avoiding the rounded edges of the perforation which would only very gradually admit light. The arcuate slots in the scanning cylinder cooperate with only the middle portions of the perforations to accurately define the light intensity so that the intensity of the light remains practically constant throughout each scanning interval.

An important feature of the invention resides in providing a circuit for operating the system herein set forth, in which the plate current is reduced to zero in at least two places in a multistage electron tube amplifier, so that the "on" and "off" conditions are not affected by values of the control light above or below a certain value; that is, the amplifier used in the present photoelectric transmitter has two stages. In the first stage, a certain amount of light cuts off the plate current, and any additional illumination has no effect in altering the final output of the amplifier, the current in the second stage being determined by the local adjustment of the circuit. When the light falls below a certain value, sufficient current flows in the plate circuit of the first tube to reduce the current in the plate circuit of the second tube to zero, and any further decrease of illumination has no effect on the final output.

A better understanding of the invention may be had from the following description, taken in conjunction with the accompanying drawings, wherein like reference characters designate similar parts throughout the several views, and in which.

Figure 1:
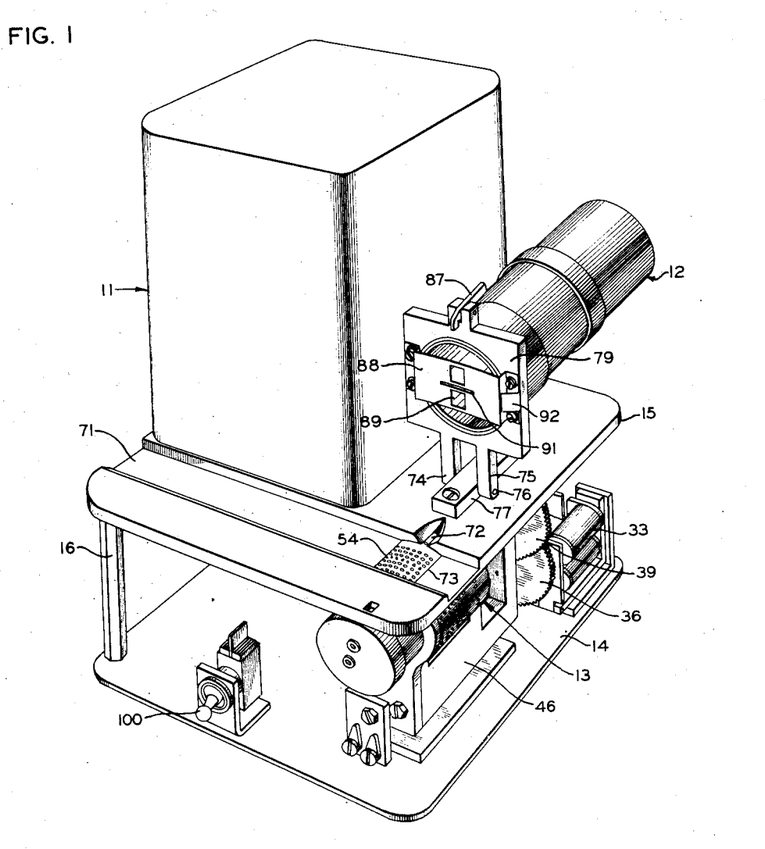
Fig. 1 is a perspective view of one form of photoelectric transmitter according to the present invention.
Figures 2, 3:
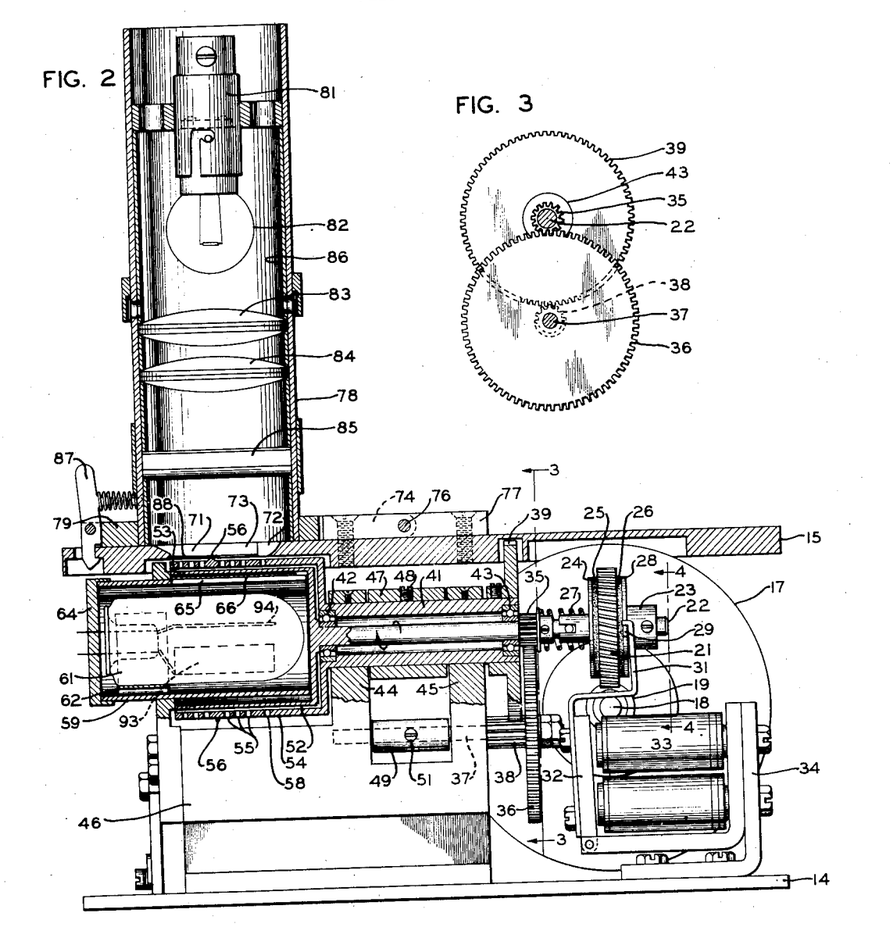
Fig. 2 is a vertical cross-sectional view taken through the optical apparatus and the scanning mechanism of the device shown in Fig. 1.
Fig. 3 is a sectional view taken on line 3—3 of Fig. 2.

Having reference to Fig. 1 which is a perspective representation of a specific embodiment of the present invention, the electrical apparatus for amplifying the photoelectric responses, the optical apparatus and the scanning mechanism are indicated generally by the reference characters 11, 12, and 13 respectively. The base portion of the transmitter comprises a bottom plate 14 and a top plate 15 which are separated by posts 16. Referring particularly to Fig. 2, there is shown mounted on bottom plate 14 a motor 17, on the armature shaft 18 of which is fixed a pinion 19 which meshes with a worm gear 21 carried loosely on a shaft 22. Gear 21 is frictionally connected to shaft 22 for rotation therewith by means of a friction clutch comprising a backing member 23 fixed to shaft 22, a pressure member 24, a pair of discs of friction material 25 and 26, and a compression spring 27.

Figure 4:
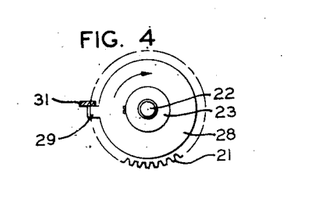
Fig. 4 is a sectional view taken on line 4—4 of Fig. 2.

The flange 28 on member 23 is provided with a lug or projection 29, more clearly indicated in Fig. 4, which coacts with an arm 31 carried on the armature 32 of an electromagnet 33 mounted on a bracket 34 fixed to base plate 14. The electromagnet 33 may be connected to a control switch in any suitable manner as, for example, to a contact controlled by a loop in the tape as is usual with tape transmitters. Also secured to shaft 22 adjacent to member 24 is a pinion gear 35 which meshes with a gear 36 carried on a stud shaft 37. Integral with gear 36, or otherwise secured thereto, is a pinion gear 38 which meshes with a gear 39 fixed to a sleeve member 41 which is carried by a pair of ball bearing assemblies 42 and 43 on shaft 22. Sleeve 41 is journaled in bearings 44 and 45 integral with a standard or bracket 46. Endwise movement of sleeve 41 is prevented by a spacing collar 47 secured to sleeve 41 by set screw 48. Similarly, end-thrust of shaft 37 is prevented by a collar 49 secured thereto by means of a set screw 51.

Figure 5:
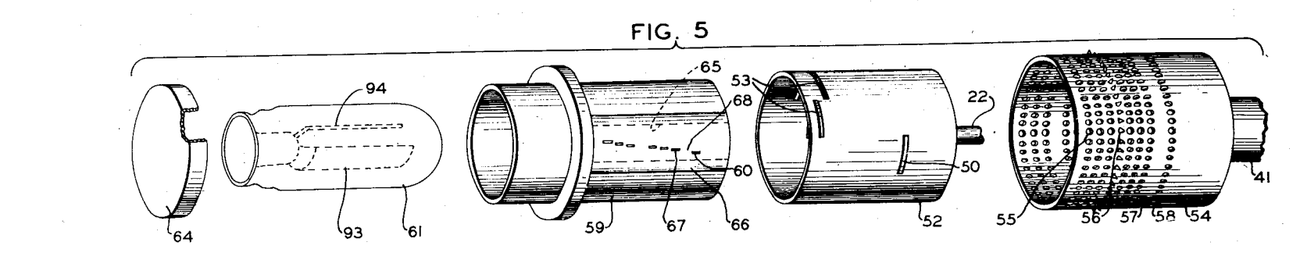
Fig. 5 is an exploded view of the scanning mechanism employed in the form of the invention shown in Fig. 1.

Shaft 22 terminates in an open-ended cylindrical or drum portion 52 which portion is provided, as more clearly indicated in Fig. 5, with a helical series of slots 53. Similarly, the sleeve 41 terminates at its left-hand end in an open-ended cylindrical or drum portion 54 arranged in nested relation with cylinder 52. Portion 54, as indicated in Fig. 5, is provided with a plurality of circumferentially arranged perforations or holes 55, the holes being at the same time arranged in longitudinal alignment. In the present instance, there are forty-nine rows of holes arranged parallel to the axis of shaft 22, and the gears 35, 36, 38, and 39 (Fig. 3) are so proportioned that the inner cylinder 52 on shaft 22 makes forty-nine revolutions while the cylinder 54 on sleeve 41 makes one revolution. The cylinder 54 is also provided with a row of feed pins 75

56 corresponding to the feed holes in the control strip, a feed hole of course being provided with each longitudinally aligned row of holes. As indicated in Fig. 5, there is no row of holes provided in the space indicated by 57, this space being employed to provide the interval for transmitting a spacing signal representative of the start impulse. A row of holes marked 58 represents the row for sending the marking or stop signals, the remaining six circumferential rows of perforations 55 being indicative of the character code signals. The structure disclosed herein is designed to be used with tape perforated in accordance with a six-unit code. However, the apparatus may readily be altered to operate in connection with any other code without requiring any basic changes in the structure. Also, although the structure is described as being operable with perforated tape, it may readily be employed with translucent or transparent strips or tapes in which the code signal combinations are imprinted thereon. In this event the photocell will respond to the signals in a reverse manner; for example, when perforated tape is used the presence of a perforation over the scanning area will permit the beam of light to impinge upon and activate the photocell. However, when translucent printed tape is employed the presence of a printed area, indicative of a marking impulse and comparable to a perforation, will affect the photocell reversely to check the flow of electrons therein.

Figure 17:
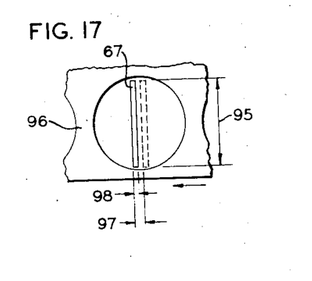
Fig. 17 is a diagram showing relation of fixed slot and perforation in tape.
Figure 18:
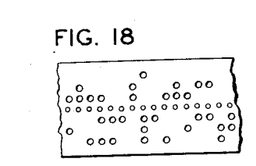
Fig. 18 is an illustration of a portion of perforated tape.
Figure 19:
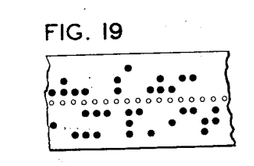
Fig. 19 is an illustration of a portion of printed tape.

Arranged within the drum or cylinder 52 and fixedly carried on the frame 46 is a cylinder 59 in which is mounted a photoelectric cell 61. In the present embodiment, the photoelectric cell bulb or tube is carried in a spring clip 62 secured to the cylinder 59. The cylinder 59 is covered by a cap 64 slidably fitted thereon. A slot 65 (Figs. 2 and 5) is provided at the upper side of the cylinder 59 and is of a width sufficient to cover the scanning area. Fitted over slot 65 is a thin plate or shutter 66 which, as clearly illustrated in Fig. 5, is provided with a diagonal series of narrow slots 67, each slot of which coincides with one of the circumferentially arranged rows of holes in cylinder or drum 54. The obliquity of the row of slots 67 is commensurate with the distance between each axial row of holes 55 on cylinder 54, which is equivalent to the distance between consecutive transverse rows of holes in the perforated tape. Slots 67 are very narrow (for example, ten one-thousandths of an inch wide) and serve to limit and define the beam of light so that as the scanning cylinder 52 rotates to admit and cut off the light, the period during which the light is changing from zero to full value will be as short as possible. In this manner the accuracy of the impulses is unaffected by the holes in the tape. As shown in Fig. 17, the diameter of the perforation is indicated by label 95 and is, in perforated tapes generally employed in the telegraphic art, .070 inch. Therefore, by way of example, the slits 67 (Fig. 5) may for purpose of explanation, be assumed to be approximately .070 inch long and .010 inch wide, and the scanning slots 53 in scanning drum 52 are, to coperate therewith, substantially .070 inch wide. The angular extent of slots 53 for a six-unit start-stop code would be 45°, and somewhat longer for a five-unit code. In practice the tape 96 moves in the direction of the arrow and the motion of the tape while one impulse is transmitted is indicated by label 97. The width of the slit 67 is indicated in Fig. 17 by label 98 and is, according to the foregoing assumptions, .010 inch. As the tape moves a distance indicated by 97, the scanning cylinder 52 rotates substantially 45° or equivalent to the arcuate length of slot 53. In this manner, by the relative movements of tape 96 and scanning cylinder 52 coacting with slits 67, a precise definition of light beam is obtained, and the admittance and cutting-off of the light which impinges on the photocell is sharp and substantially instantaneous. To properly align the parts of the scanning mechanism, the middle of a slot 53 is set in line with the corresponding slot 67, and then cylinder 54 is adjusted so that the center line of the corresponding perforation in the tape is in the same alignment. By analogy, the scanning drum 52 corresponds to a transmitting commutator and the light beam corresponds to the brushes. Although the perforations are arranged transversely of the tape, the perforations are by the foregoing method sensed sequentially, and the signal impulses are thus transmitted sequentially. Thus, as the tape moves a distance equivalent to the spacing or pitch between the successive rows of holes; namely, .010 inch according to the arrangement described, the scanning operation, previously set forth, is repeated for each element of the code, as well as for the start and stop impulses. The right-hand slot of the row of slots 67 (as viewed in Fig. 5), corresponds to the stop impulse and no slot is provided for the start impulse, this position being represented by the space 68.

The top plate 15 is provided with a tape guideway 71 which, in the region of the cylinder 54, is cut away to permit the outer peripheral surface of cylinder 54 to protrude upwardly through the apertured portion 73 so that the tape, as it passes through the guideway 71, will be raised over the outer surface of the cylinder 54, thereby engaging several feed pins and thus reducing the possibility of damaging the tape by tearing the feed holes. Plate 15 is also provided in alignment with the scanning position of the scanning cylinders with a slotted portion 72 which permits the light to cooperate with the row of holes in cylinder 54 corresponding to the stop impulses. The plate 15 in the region of slot 72 is flared on its upper side to permit a full beam of light to impinge on the surface of the cylinder.

Mounted on top of the plate 15 above the apertured portion 73 is the optical system or apparatus 12. In the embodiment being described, the optical apparatus 12 is tiltable and is hinged to the plate 15 by means of arms 74, 75, hinge pin 76, and block 77 (Fig. 1). Having reference to Fig. 2, the optical apparatus comprises a cylindrical tube 78 fitted into a base plate 79. Inside of the tube 78 and appropriately arranged are a lamp socket 81, exciter lamp 82 (which may be a standard automobile bulb), condensing lenses 83 and 84, and a cylindrical lens 85, suitable spacing members, as for example 86, being provided to retain said members in their operative positions. The cylindrical lens 85 is mounted so that its longitudinal axis is parallel to and in the same vertical plane as the obliquely arranged slots 67 in cylinder 59 (Fig. 5), thus being disposed in tube 78 in a manner comparable to lens 175 shown in Fig. 9. A spring actuated latch 87 is mounted in base plate 79 of the optical apparatus which cooperates with a slot in plate 15 to hold the optical apparatus positively in its operative position. Attached to the bottom side of the base plate 79 (Fig. 1) is a resilient or yieldable tape guiding shield 88 which is provided with a pair of light apertures 89 and a tape feed pin guiding slot 91. An inclined tape guiding portion 92 provided at the entering end facilitates the introduction of the tape when the optical apparatus 12 is in its operative position.

In the exploded view in Fig. 5, it is apparent that the several parts; namely, the cap 64, photoelectric cell 61, cylinder 59, inner drum 52, and outer drum 54, are capable of being assembled in the manner of a telescope to provide a compact scanning arrangement. As indicated in Figs. 2 and 5, the photoelectric cell is arranged with its semi-cylindrical, light sensitive cathode 93 having its inner or concave surface facing vertically so as to receive the light rays from the optical system, the anode 94 being arranged above the cathode 93.

In the operation of the transmitting apparatus as just described, as will be understood from the foregoing disclosure, the perforated tape is laid upon the cylinder 54 (Fig. 1) and the optical arrangement 12 is rotated about hinge pin 76 to the vertical position shown in Fig. 2. The transmitting apparatus is started in operation by closing through switch 100, for example, the circuit to the motor 17, thus causing pinion 19 and gear 21 to be rotated. The scanning cylinders 52 and 54 are held against rotation due to the unenergized condition of electromagnet 33 and the consequent arrestment of disc 28 by armature lever 31. When electromagnet 33 becomes energized, for example, by closing the contacts of a tape stop switch, the arm 31 is disengaged from stop disc 28 and the scanning cylinders 52 and 54 are permitted to rotate through the medium of the friction clutch associated with gear 21. Cylinder 52 is rotated directly through shaft 22, and cylinder 54 is rotated at a speed, in the present instance, of one forty-ninth that of cylinder 52 due to the reducing gear arrangement including gears 35, 36, 38, and 39.

This movement of the cylinders 52 and 54 together with the arrangement of the scanning plate 66 serves to control the light beam in its action upon the photoelectric cell by utilizing the perforations in the tape to permit the light beam to impinge upon the photoelectric cell when a code perforation passes across the path of the light beam, and to intercept the light beam by the unperforated portions to prevent the impingement of the beam of light upon the photocell. The fixed scanning plate 66 with its series of slits arranged obliquely or slightly offset in the direction of tape travel serves to provide a means, as previously set forth, for obtaining an accurate definition of the light beam flashes permitted to reach the cathode element of the photoelectric cell. In this manner the light beam is quickly turned on and cut off during the passing of a perforation through its path, and the sharpness of the character signals is not affected at all by the round edges of a perforation, thus causing the photoelectric cell to be activated abruptly. The interval of time during which the photoelectric cell shall remain activated for each element of a code represented by the perforations in the tape is controlled, as already noted, by the angular extent of the corresponding peripheral slot 53 in scanning cylinder 52.

As previously alluded to, the holes 58 in cylinder 54 function through the cooperation of slot 50 in scanning cylinder 52 and slot 60 in scanning plate 66 to activate the photoelectric cell 61 invariably once each complete revolution of cylinder 52 to transmit the stop impulse. Of course, since the start signal is of spacing nature no apertures are required to effect its transmission and hence, as previously mentioned, only a blank space is provided therefor on cylinders 52 and 54 and on scanning plate 66.

To interrupt transmission, the circuit for electromagnet 33 is opened, and the consequent deenergization of magnet 33 will cause armature lever 31 to cooperate with stop disc 28 to arrest the scanning mechanism in such position that a hole 58 of cylinder 54, angular slot 50 of cylinder 66, and slot 60 of scanning plate 66 are in coincidence, thus rendering the photoelectric cell 61 steadily activated to transmit a prolonged stop signal or impulse over the line wire, as is usual in start-stop systems when transmission is interrupted.

*Modification*

According to Figs. 6–12 inclusive, a modified form of the invention hereinbefore disclosed and embodying the same fundamental principles has been provided. Similar to the foregoing embodiment, the photoelectric transmitter shown in Fig. 6 comprises essentially an optical system or apparatus and a scanning mechanism indicated generally as 101 and 102, respectively. This modified form of the invention differs from the first form described, in the arrangement of the optical system, in the separation of the feed pins from the scanning cylinder, and the simplification of the scanning arrangement. It also contemplates the use of mirrors to reflect the light beam instead of utilizing the light beam directly from its source. This embodiment provides an optical apparatus which is fixed to the top plate of the base in contradistinction to the originally described form wherein the optical apparatus is tiltable. The scanning cylinder and the slotted element are brought into closest possible proximity with each other, thus insuring a sharp cut-off of the light beam. The scanning arrangement comprises a single fixed plate provided with a single long, narrow slot instead of the shutter previously described having the diagonal series of slots 67 (Fig. 5). The rotatable scanning cylinder located immediately below the fixed plate is provided with a helically arranged series of slots corresponding in number to the number of code hole positions in the tape plus an extra slot corresponding to the stop signal. The plate or shutter of the form of the invention shown in Figs. 6 to 13 is made of opaquely coated glass in which the slit is formed by cutting away a portion of the opaque coating. This plate also serves as a suitable cover plate to seal the chamber containing the photoelectric cell and the rotatable scanning cylinder and prevents the collection of tape dust and other particles therein.

Figure 6:
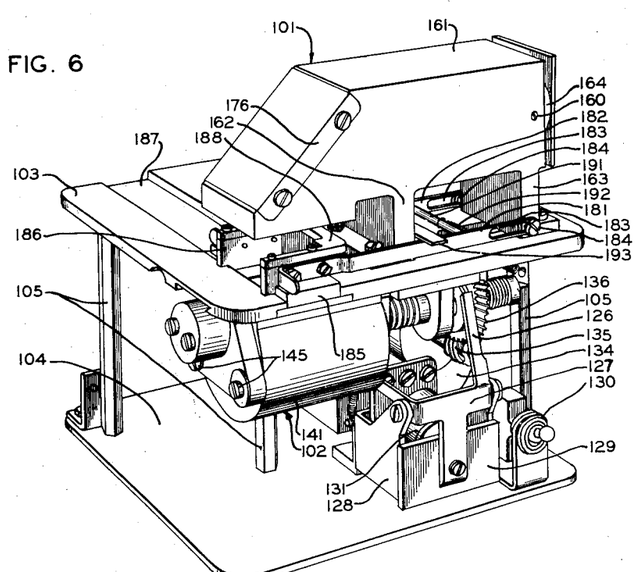
Fig. 6 is a perspective view of another form of photoelectric transmitter according to the present invention.
Figure 7:
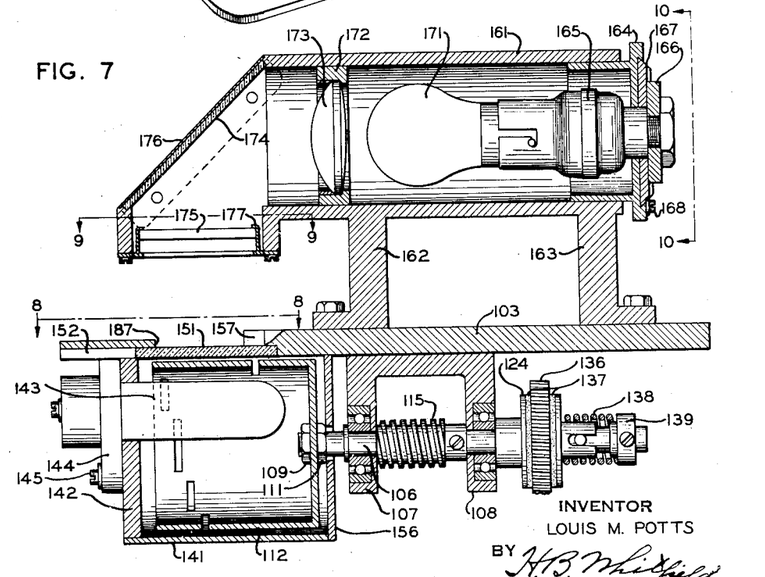
Fig. 7 is a cross-sectional view taken through the optical apparatus and scanning mechanism of the transmitter shown in Fig. 6.
Figure 13:
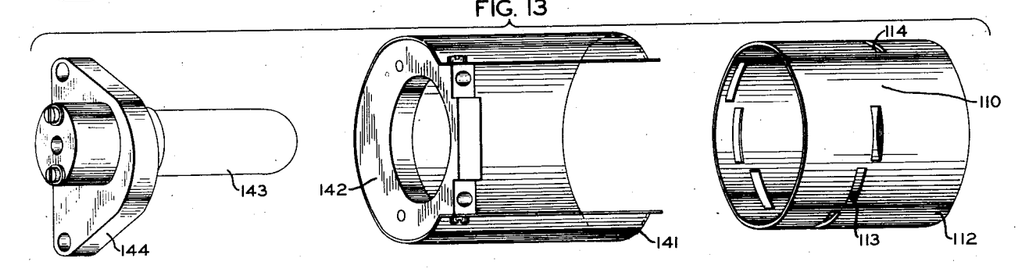
Fig. 13 is an exploded view of one form of scanning mechanism to be used with the transmitter shown in Fig. 6.

In the form of the invention shown in Fig. 6, the base portion comprises a top plate 103, a bottom plate 104, and vertical posts 105 separating said plates. From the lower surface of top plate 103 is suspended (as shown in Figs. 6 and 7) the scanning arrangement 102 which comprises a shaft 106 journaled in brackets 107 and 108 depending from and integral with top plate 103. Clamped between nuts 109 and 111 threaded on shaft 106 at the left extremity thereof (as viewed in Fig. 7) is a scanning cylinder 112. In this manner cylinder 112 is adjustable longitudinally of shaft 106, as well as angularly thereof with respect to the stop position of the shaft, as will hereinafter appear. The scanning cylinder 112 is, as indicated in Fig. 13, provided with a helically arranged series of slots 113 corresponding in number to the number of code hole positions in the tape and an additional slot 114 corresponding to the stop signal. A suitable space is afforded by the portion 110 of the scanning drum 112 between the code slots 113 and the stop signal slot 114 to accommodate the start signal, no slot being provided for the latter for the reason that the start signal is always a spacing signal and no light need impinge upon the photoelectric cell carried within the scanning cylinder. However, a suitable space must be provided to compensate for the time interval allotted to the start signal. The ends of slots 113 and 114 may, if desired, be inclined to correspond with the inclination or obliquity of slot 153 in shutter 151 (Figs. 8 and 13) thus affording a more precise control of the light flashes.

Figure 12:
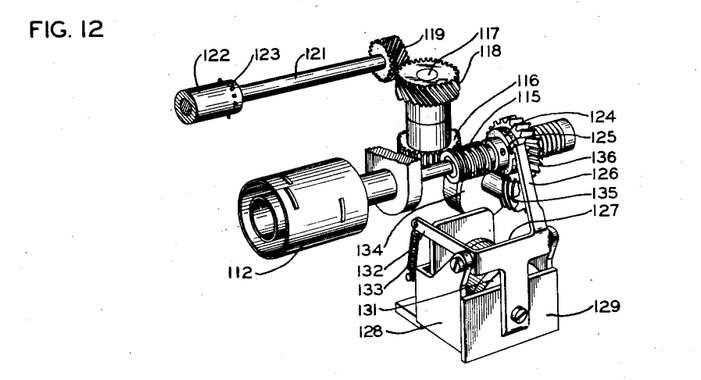
Fig. 12 is a perspective view of the start-stop and tape feeding mechanisms.

Fixedly carried on the shaft 106 and disposed between the brackets 107 and 108 is a worm 115 which, as shown in Fig. 12, meshes with a worm gear 116 secured to a vertical shaft 117 carried by the top plate 103. A gear 118 is also secured to shaft 117 which meshes with a gear 119 secured to a horizontal shaft 121 suitably supported by the top plate 103. Secured to the extremity of shaft 121 opposite to gear 119 is a cylinder 122 provided with a circumferential series of tape feed pins 123 which, as is well known, cooperate with a series of feed holes in the perforated tape to effect the movement thereof. The size of the gears 115, 116, 118, and 119 are so calculated as to produce the proper rate of movement of the tape which, as will hereinafter appear, is caused to move continuously to cooperate with the rotating scanning cylinder to effect the sensing sequentially of the code combinations perforated in the tape.

As indicated in Figs. 7 and 12, there is secured to the shaft 106 to the right of bracket 108 a stop disc 124 which is provided with a tooth or projection 125 which cooperates with a stop arm 126 associated with an armature lever 127 pivotally mounted on frame 128. Armature lever 127 is also provided with a pole piece 129 which cooperates with an electromagnet 131 mounted on bracket 128. Armature lever 127 tends to rotate in a counterclockwise direction (as viewed in Fig. 12) through the instrumentality of arm 132 and spring 133. During the transmission of signals, electromagnet 131, which may be connected in a circuit including, for example, a contact controlled by the loop in the tape, is energized and attracts pole piece 129 to rotate lever 127 in a clockwise direction against the action of spring 133 to effect the disengagement of arm 126 from stop tooth 124 to permit the rotation of shaft 106. Rotation is imparted to shaft 106 by a motor 134 (Figs. 6 and 12) which has secured to the armature shaft thereof a pinion 135 which meshes with a worm gear 136 frictionally carried on shaft 106 through the instrumentality of friction washers 137 and compression spring 138 (Fig. 7). The compressive action of spring 138 is adjusted by a collar 139 slidably movable on shaft 106.

Figure 8:
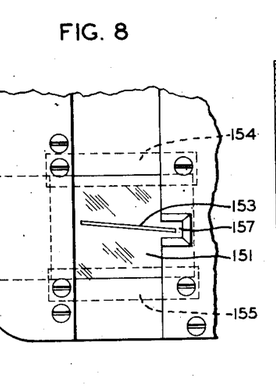
Fig. 8 is a view taken on line 8—8 of Fig. 7.

Surrounding the scanning cylinder 112 is a cover member 141, and fixed to one end of the cover member 141 is an end piece 142 provided with an aperture eccentrically located with respect to the scanning cylinder 112 to permit the insertion of a photoelectric cell 143 in as close proximity to the scanning position as possible. The photoelectric cell 143 is suitably mounted in a portion 144 of insulating material which is mounted by screws 145 to the portion 142. Disposed above the scanning cylinder and arranged over that region thereof embracing the helically arranged slots is the glass plate 151 which according to the form of the invention shown in Figs. 7 to 13 comprises an opaquely coated glass element in which the slit 153 is formed by cutting away a portion of the opaque coating. It may also be advantageous to coat both the upper and lower surfaces of the glass plate 151 and to put corresponding and registerable slits in both surfaces. Plate 151 fits slidably in a groove 152 in the lower side of top plate 103 and is held in place by a pair of supporting guides 154 and 155 (Fig. 8). Plate 151 thus is readily removable for cleaning, and due to the fact that it is snugly fitted into plate 103, it serves as a cover plate to close the chamber containing the photocell 143. It has been found that better results are obtained with perforated tape when the tape is spaced a greater distance from the surface of the scanning cylinder; that is, by employing a thicker plate 151 whereby the slits in the upper and lower coated surfaces are spaced farther apart. A plate of glass having the upper and lower surfaces covered with opaque coatings which are scored to provide slits, as previously described, affords convenient arrangement of spaced light apertures. However, any other arrangement of spaced apertured plates could be employed, and in Figs. 20 and 21, in connection with an illustration of the advantages of spaced light apertures, an embodiment of the invention consisting of thin metallic plates apertured and spaced apart is shown.

Figures 20, 21:
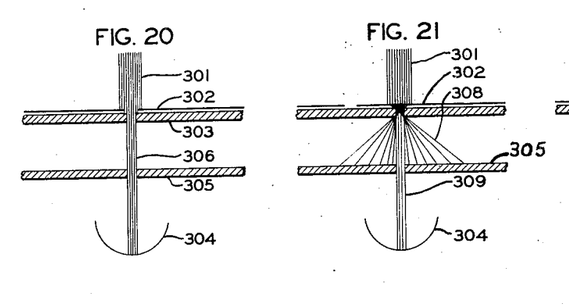
Figs. 20 and 21 are schematic representations of the light controlling effects of spaced apertured plates.
Figure 22:
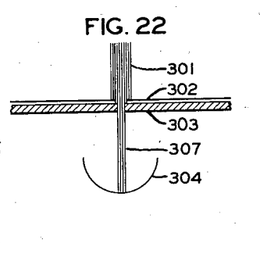
Figs. 22 and 23 are schematic representations of the light controlling effects of a single apertured plate.

In each of the Figs. 20, 21, 22, and 23 the reference numeral 301 designates a beam of light, assumed for purposes of explanation, to consist of parallel rays, which is incident upon the tape 302. Reference numeral 303 represents an apertured plate in close proximity to which the tape 302 travels. Numeral 304 represents the light-sensitive cathode of a photocell. The arrangement shown in Figs. 20 and 21 includes the spaced apertured plate 305. In Figs. 20 and 22 a signalling aperture in the tape 302 is shown in registry with the light transmitting apertures in the plates, whereas in Figs. 21 and 23 a blank or imperforate portion of the tape is in registry therewith. The relative intensities of light transmitted to the photocell cathodes 304 are indicated at 306 and 307 in Figs. 20 and 22 respectively and these intensities would be substantially equal in the two systems, for the reason that the light is assumed to consist of parallel rays and it passes through the tape perforation and through one or two slits or apertures substantially undiminished.

Figure 23:
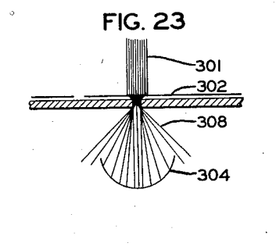

When an imperforate portion of the tape is positioned over the apertures in the arrangements shown in Figs. 21 and 23, assuming that the tape is translucent, which is a characteristic of the tape generally used in the telegraph art, different results are obtained with the two systems. In addition to transmitting a lesser quantity of light than is transmitted through a perforation in the tape, the translucent material causes some of the light that is transmitted to be diffused and scattered in various directions as indicated at 308 in Figs. 21 and 23. With the arrangement shown in Fig. 23, the cathode 304 becomes activated not only by the low-intensity undeviated beam but also by some of the scattered light. However, the second apertured plate 305 of Fig. 21 intercepts and dissipates or further scatters substantially all of the diffused light, so that only the undeviated beam, 309 of low intensity, reaches the cathode 304. Thus it is apparent that the difference, in effect upon the photocell, between perforate and imperforate portions of the translucent tape is much greater when spaced apertured opaque plates are used than when single apertured plates are employed. Applying the foregoing statement directly to the drawings, the difference in the intensities of light incident upon the cathodes 304 of Figs. 20 and 21 is much greater than the difference between the intensities of light incident upon the cathodes of Figs. 22 and 23, and the practical result is much sharper cut-off of light, which is a desirable condition. Of course, if opaque tape material is used, a precise and complete cut-off of light is obtainable due to the tape alone, but because of the general use of translucent tape in the telegraph art, the present invention includes means for the effective employment of that kind of tape.

It is to be understood that the transmitting medium between the apertured opaque members of Figs. 20 and 21 may be air, glass, or any transparent substance, and that the opaque members may be independent rigid plates or may be opaque coatings on the surfaces of transparent material.

The cylindrical cover member 141 (Fig. 7) is closed at its inner end by a plate 156 secured to plate 103. Slit 153 is disposed obliquely and at such an angle as to compensate for the continuous movement of the tape; that is, due to the obliquely arranged slit it is possible to transmit a plurality of elementary signal impulses photoelectrically in the interval of time during which the control tape moves the distance between two consecutive rows of holes in the longitudinal direction of the tape.

The top plate 103 is notched at 157 and the slot 153 is adapted to extend thereinto. The portion of slit 153 which extends into notch 157 is beyond the edge of the tape and cooperates invariably with one of the helically arranged slots in scanning cylinder 112 to transmit the stop signal, which in most systems of start-stop operation is of marking nature. The sides of notch 157 are flared to permit the fullest volume of light to impinge upon the slot 153.

Figure 9:
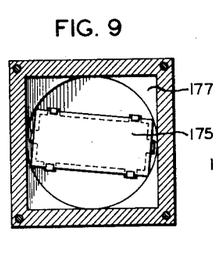
Fig. 9 is a view taken on line 9—9 of Fig. 7.
Figure 10:
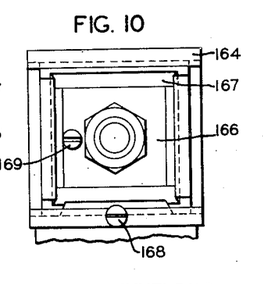
Fig. 10 is a view taken on line 10—10 of Fig. 7.
Figure 11:
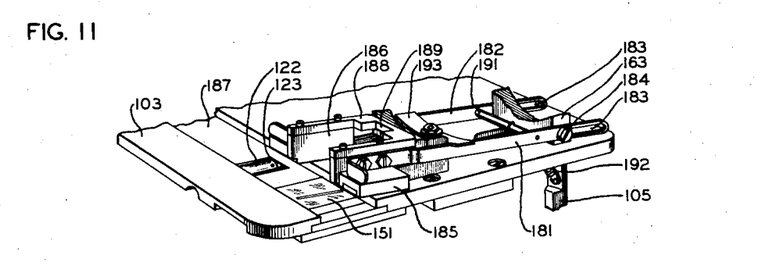
Fig. 11 is a fragmental perspective view of the top plate of the transmitter showing the tape guiding means.

The optical apparatus 101 comprises a housing 161 mounted by means of integral members 162 and 163 upon top plate 103, and a cap member 164 adapted to be telescoped into said housing. Cap member 164, after being adjusted telescopically, is locked by means of a lock screw 160 (Fig. 6). Adjustably carried in the cap member 164 is a lamp socket 165 secured to a plate 166 dovetailed for vertical movement into a second plate 167 which, in turn, is dovetailed for horizontal movement into cap 164. Plate 167, after being adjusted, is locked by a lock screw 168, and plate 166 is locked after adjustment by a lock screw 169 (Fig. 10). With this arrangement, incandescent lamp 171 inserted in the socket 165 is universally adjustable. Presented in front of lamp 171 and carried in a frame 172 is a lens 173 which directs the light rays from lamp 171 onto an inclined mirror 174, disposed at a 45° angle so as to reflect the rays of light downwardly through a cylindrical lens 175 onto the photoelectric cell 143. Mirror 174 is suitably positioned in the housing 161 and held in place by a cover plate 176. Cylindrical lens 175 is carried in a frame 172 attached to the housing 161 and as indicated in Figs. 7 and 9, is arranged so that its longitudinal axis is parallel to and in the same vertical plane as the slot 153.

The tape-guiding mechanism associated with the form of the invention shown in Fig. 6 comprises a pair of arms 181 and 182 (Figs. 6 and 11) provided with slots 183 and adapted to be slidably supported on stud screws 184 carried in member 163. At the forward end of arms 181 and 182 are secured angle members 185 and 186, respectively, the horizontal arms of which fit snugly into a tape guideway or track 187 formed in top plate 103. Secured to angle members 185 and 186 and serving to maintain arms 181 and 182 in proper spaced relation is a U-shaped member 188 having its web portion notched at 189 (Fig. 11) to coincide substantially with notch 157 in plate 103. A rod 191 is disposed between arms 181 and 182 at a suitable point between members 162 and 163, and distended between rod 191 and post 105 is a spring 192 which tends to urge arms 181 and 182 (and hence the tape guide means) rearwardly. A leaf spring 193 is suitably mounted upon plate 103 to the rear of member 162 and embraces arms 181 and 182 to urge these arms downwardly. In Fig. 6 the tape guiding mechanism is shown in its operative position resting in the tape guideway 187, having been pulled forward from its position indicated in Fig. 11 against the action of spring 192. In this position there is provided between angle members 185 and 186 and the floor of guideway 187 just sufficient space to permit the tape to pass readily therethrough. The horizontal leg of angle member 186 is so conformed as to provide suitable clearance for the tape feed roller 122 and tape feed pins 123. The outer ends of arms 181 and 182 are laterally disposed to enable the tape guiding mechanism just described to be readily manipulated. To shift the tape guiding means to its inoperative position shown in Fig. 11, the forward portion thereof is raised against the pressure exerted by leaf spring 193 sufficiently to clear the guideway 187, whereupon the spring 192 acts to bias the mechanism rearwardly until stud screws 184 engage the forward end of slots 183. This form of tape guiding mechanism affords at all times a clear view of the tape at the scanning area, and being self-contained and readily shiftable, facilitates adjustment of the scanning elements.

The operation of the photoelectric transmitter shown in Fig. 6 is similar to that disclosed in Fig. 1. However, as is manifest, the uniformly perforated cylinder (such as cylinder 54, Fig. 1) has been dispensed with and the tape feed roller disassociated from the scanning region. With this arrangement, the three essential elements for performing the scanning function; namely, the scanning cylinder, the perforated tape, and the scanning plate, are brought in closest possible proximity with each other, and collectively they are arranged closer to the optical system or apparatus. With the transmitter shown in Fig. 6, the relative speeds of rotation of tape feed roller 122 and scanning cylinder 112 are such that the cylinder 112 makes one complete rotation during the interval of time it takes one transverse row of perforations in the tape to pass over the scanning slot 153 in scanning plate 151. With this arrangement, as with the embodiment shown in Fig. 1, the time interval of each signal element is governed by the angular extent of the slots 113 (Fig. 13) in scanning cylinder 112, and due to the close proximity of the cylinder 112 to the scanning plate 151 the light-flashes upon the photoelectric cell 143 will be sharp and distinct to cause a sharp turning-on and cutting-off of the photoelectric effect.

Similarly to the arrangement shown in Fig. 1, the transmitter indicated in Fig. 6 is initiated into operation by closing the circuit to the motor 134, as for example, by operating toggle switch 130, thus causing the rotation of pinion 135 and gear 136. The scanning cylinder 112 and tape feed roller 122 are prevented from rotating due to the deenergization of electro-magnet 131 and the consequent engagement of armature lever 127 with stop disc 124 (Fig. 12). Upon energization of magnet 131, by closing the contacts of a tape stop switch or through some manually operated means, the arm 126 of lever 127 becomes disengaged from stop disc 124 and the scanning cylinder 112 and tape feed roller 122 are permitted to rotate through the instrumentality of a friction clutch associated with gear 136. Cylinder 112 is rotated directly through shaft 106, and feed roller 122 is rotated through the train of gears including gears 115, 116, 118, and 119, the effect of pinion 115 being to cause roller 122 to rotate at a much lower speed than cylinder 112, to produce the speed relation between tape movement and scanning cylinder rotation previously described.

The tape is placed in the tape track or guideway 187 and the tape guide members 185 and 186 are caused to rest thereupon, just sufficient space being provided between portions 185—186 and the tape guide track to permit the ready movement of the tape. In the event that adjustment between the scanning cylinder 112 and scanning plate 151 is necessary, the tape may be readily removed by raising and shifting the tape guide mechanism, and the rotation of the scanning mechanism arrested by opening the circuit for magnet 131, whereupon the cover plates 141 and 156 are removed to permit access to adjusting nuts 109 and 111. The scanning slots 113 may then be viewed through the scanning slit 153 to determine the proper or desired relationship therebetween, after which adjustment, the parts are readily and quickly assembled and transmission again initiated. Adjustment of the light source 171 may be easily accomplished by shifting plates 166 and 167, as previously described.

Figure 14:
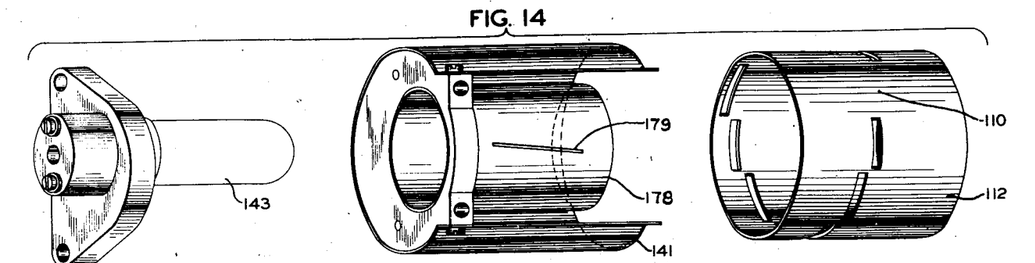
Fig. 14 is an exploded view of a modified form of scanning mechanism for the transmitting apparatus shown in Fig. 6.

In Fig. 14 is shown a modified form of scanning arrangement in which the fixed plate 151 (Fig. 8) is substituted by a cylinder 178 provided with an oblique slot 179 analogous to slot 153 of plate 151. According to this embodiment, the slot will be located internally of scanning cylinder 112 instead of externally thereof as in the form hereinbefore described. The cylinder is positioned eccentrically with respect to the casing 141 and scanning cylinder 112 so that the slot is disposed as close as possible to the periphery of the cylinder 112. In this modification of the structure, the plate 151 is removed and the light rays from lamp 171 pass through the aperture resulting therefrom similar to the aperture 73 of the embodiment shown in Fig. 1.

*Electrical circuit*

Figure 15:
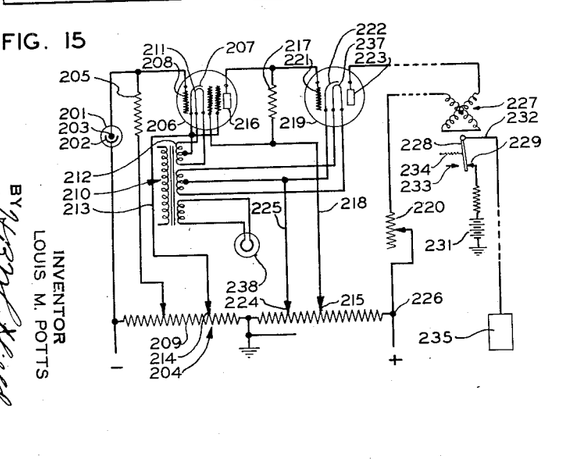
Fig. 15 is a schematic diagram of the electrical circuit at the transmitting station when perforated tape is employed.

In Fig. 15 is illustrated a circuit arrangement employed in conjunction with the transmitting apparatus hereinbefore disclosed, and in which perforated tape is used as the control strip. As indicated previously, a system is provided in which the plate current is reduced to zero in at least two places in a multi-stage amplifier, so that the "on" and "off" conditions are not affected by values of the control light above or below a certain value; that is, the amplifier used with the photoelectric transmitter disclosed has two stages. In the first stage, a certain amount of light cuts off the plate current, and any additional illumination has no effect in altering the final output of the amplifier, the current in the second stage being determined by the local adjustment of the circuit. When the light falls below a certain value, sufficient current flows in the plate circuit of the first electronic tube to reduce the current in the plate circuit of the second electronic tube to zero, and any further degrees of illumination have no effect on the final output.

In the circuit shown in Fig. 15, the photoelectric cell is shown at 201, and as is known, the impingement of light upon the light sensitive cathode 202 causes the emission of electrons therefrom which flow toward the anode or positive electrode 203 of the photocell. The cathode 202 is supplied with operating voltages from a source 204, and ordinarily, changes in the electron stream flowing within the cell, due to varying light intensities falling thereon, will cause varying potential differences to be set up across a resistance 205 which is connected in series with the photocell electrodes. The resistance 205 is also connected in the grid circuit of a multi-electrode electronic tube 206 having a cathode 207 and a control grid 208. The resistance 205 and the cathode 207 may be so connected to the source 204 as to provide a normal grid biasing source 209. The cathode 207 is of the hot cathode type and is heated by a filament 211 connected to a source of current 212, for example, the secondary circuit of a transformer 210. As thus far described, the circuit comprising source of current 204, photocell 201, and resistance 205, is the source or input circuit for the grid control circuit comprising grid 208, cathode 207, conductor 213, biasing source 209, and resistance 205. The plate circuit of electronic tube 206 includes the portion of potentiometer source 204 included between taps 214 and 215, conductor 213, cathode 207, plate 216, resistance 217, and conductor 218, and is the source or input circuit for the grid control circuit of a second electronic tube 219 comprising a grid 221, cathode 222 and a plate 223. The control circuit for grid 221 includes portion of source 204 included between taps 215 and 224, conductor 218, resistance 217, grid 221, cathode 222, and conductor 225. The plate circuit of tube 219 extends from portion of source 204 between 224 and 226, conductor 225, cathode 222, plate 223, thence through winding of line relay 227, through variable resistance 220 and back to source 204. Variable resistance 220 is provided to control the plate circuit of the tube 219. Cathode 222 is heated by a filament 237 which, like filament 211, may be connected to the secondary of transformer 210. The current for the exciter lamp 238 may also be derived from the secondary of transformer 210.

Perforations in the tape are indicative of marking signals, and the presentment of a perforation into the scanning region will permit the impingement of the light beam upon the cathode of the photocell 201. The condition of the transmitting apparatus, for example, that shown in Figs. 1 to 5, during cessation of transmission of signals is such that the blank portion of the tape shuts out the light through the area used by signal hole perforations. However, the light passes through notched portion 72 (Fig. 1), thence through a perforation in drum 54, slot 50 in drum 52 and slit 60 in cylinder 59 onto the cathode 202 of photocell 201, thereby stimulating the emission of electrons therefrom and thus permitting current to flow in said source circuit which is coupled by means of resistance 205 to the control circuit for grid 208. The grid 208 is influenced thereby so as to cut off the flow of electrons from cathode 207 to plate 216 and thus reduce the plate circuit of the tube 206 substantially to zero. Cutting off the plate circuit of tube 206, which is the source circuit of the grid control circuit of tube 219, renders the grid 221 more positive and increases the flow of current in the plate circuit of tube 219 sufficiently to actuate relay 227 to hold the armature 228 thereof against contact 229 connected to battery 231 to impress marking current on the line wire 232.

When the transmission of signalling impulses over the line 232 is to be initiated, the scanning cylinders 52 and 54 are permitted to rotate to transmit first a start impulse of spacing nature and then code signal impulses of marking or spacing nature depending upon the presence or absence of perforations in the tape. Due to the blank space 57 in drum 54 and blank space 68 in cylinder 59, the light beam directed upon the photocell 201 is cut off invariably for a predetermined time interval indicative of the start impulse interval. The cutting off of the light on photocell 201 influences the grid 208 as to permit the flow of current in the plate circuit of tube 206, thereby influencing the grid 221 of tube 219 to render grid 221 more negative thereby cutting off the flow of current in the plate circuit of tube 219, and hence actuating relay 227 in such manner so as to permit spring 234 to move armature 228 to the dead contact 233 whereupon a spacing impulse will be transmitted over line wire 232. The signals thus transmitted over line wire 232 may be utilized to control the operation of a telegraph printer or recorder 235, for example, of the type disclosed in United States Patent No. 1,904,164 issued to S. Morton et al.

Figure 16:
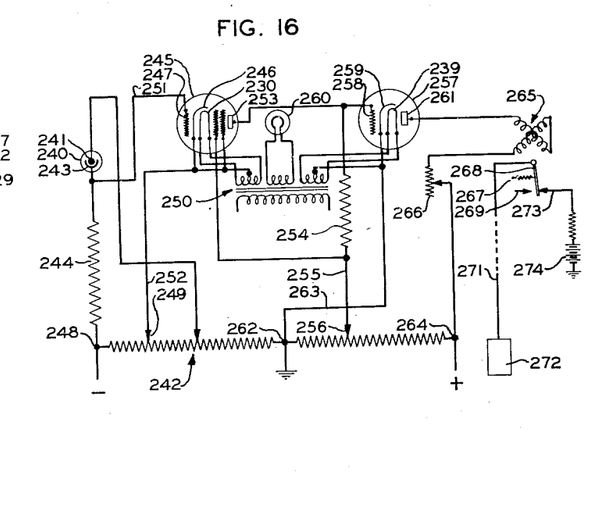
Fig. 16 is a modification of the circuit in Fig. 15 when printed tape is employed.

In Fig. 16 is illustrated how the circuit shown in Fig. 15 may be modified when translucent printed tape is employed as the control strip, thus reversing the marking and spacing light conditions on the photocell, and is similar to the circuit illustrated in Fig. 15 except that the normal grid bias of the electronic tube in the first stage of amplification is changed from a slightly negative condition to a more negative condition and the photoelectric cell has been connected in such a manner as to bias the grid positively when light falls upon the photocell. In both of the circuits (Figs. 15 and 16) the same effect is obtained upon the tube of the second stage of amplification, so that for marking signals the same kind or nature of signal is transmitted over the line wire.

It will be remembered that with the circuit shown in Fig. 15 perforated tape was employed to control the impingement of light on the photocell 201, and that a perforation in the tape was indicative of a marking signal, so that the presence of light upon the photocell 201 was likewise indicative of a marking condition. With the circuit shown in Fig. 16, the contrary is true, that is, the printed spots or areas on the translucent tape are indicative of marking signals, and being impervious to light, prevent the falling of light upon the photocell, so that in this instance the absence of light upon the photocell is indicative of a marking condition. The requisite of each circuit arrangement is that the plate circuit of the second tube in each case be controlled in the same manner so that the marking signals transmitted over the line are of the same characteristic. To achieve this result the anode 241 of photocell 240 (Fig. 16) is connected to the source 242 (analogous to 204, Fig. 15) substantially as indicated in Fig. 16. Cathode 243 of photocell 240 is supplied with operating voltages from the source 242 through a resistance 244. Like photocell 201 (Fig. 15), photocell 240 also functions as a switch to control the "on" and "off" conditions of the control light. The resistance 244 is also connected in the grid circuit of a multi-electrode electronic tube 245 having a cathode 246 and a control grid 247. The resistance 244 and the cathode 246 are so connected to the source 242 as to provide a normal grid biasing source included between terminals 248 and 249 which, as compared with the normal grid biasing source 209, Fig. 15, is more negative. Thus, the grid control circuit of tube 245 extends from source 242, through resistance 244, over conductor 251, through grid 247, cathode 246 and over conductor 252 to source 242. The negativeness of the grid control circuit just traced is effective, when no light falls upon the protocell to cut off the plate current of tube 245, the plate circuit of which extends from source 242, over conductor 252, cathode 246, plate 253, resistance 254 and conductor 255 to terminal 256 of potentiometer source 242. This plate circuit just traced is the source or input circuit for the grid control circuit of the second electronic tube 257, comprising a grid 258, cathode 259, and a plate 261. The control circuit for grid 258 includes portion of source 242 included between terminals or taps 256 and 262, conductor 255, resistance 254, grid 258, cathode 259, and conductor 263. The plate circuit of tube 257 extends from portion of source 242 between 262 and 264, through conductor 263, cathode 259, plate 261, thence through winding of line relay 265 (similar to line relay 227, Fig. 15), through variable resistance 266, and back to source 242. Cathodes 246 and 259 are heated by filaments 230 and 239 respectively, which may derive their current from the secondary windings of a transformer 250. The current to illuminate the exciter lamp 260 may also be derived from the transformer 250.

Printed areas or spots on the translucent tape are indicative of marking signals, and the presentment of a printed area into the scanning region will block or prevent the impingement of the light beam upon the cathode of the photocell 240. The condition of the transmitting apparatus during cessation of transmission of signals is such that the light beam will be prevented from impinging upon the photoelectric cell 240 due to the absence of an aperture in the scanning drum representative of the stop impulse. In connection with the embodiment of the invention contemplating the use of perforated tape as the control medium, the scanning drums 52 and 112 were provided with apertures for the stop signal or impulse and the code signal impulses. On the other hand, when printed translucent tape is employed, the scanning drums 52 and 112 must be modified so that apertures are provided for the start signal or impulse (instead of the stop impulse) and for the code signal impulses. Thus when the transmitter has ceased transmitting and is sending a prolonged stop signal, which according to the present discussion is a marking condition on the line, the light beam is blocked by the scanning cylinder or drum, and light is prevented from falling on the photocell. The effect of this condition upon the circuit shown in Fig. 16 is to render the grid 247 more negative, which reduces the plate current of tube 245, which in turn renders the grid 258 of tube 257 more positive to thus increase the plate current of tube 257. It is therefore seen that the absence of light on photocell 240 (Fig. 16) has the same effect on tube 257 as the absence of light on photocell 201 (Fig. 15) had on tube 219.

When transmission of signalling impulses over the signalling line is to be initiated, the scanning cylinders are permitted to rotate to transmit first a start impulse of spacing nature and then code signal impulses of marking or spacing nature depending upon the presence or absence of printed spots or areas on the translucent tape. Due to the aperture in the scanning drum indicative of the start impulse the light beam directed upon the photocell 240 is unobstructed and hence light is permitted to fall upon the photocell for a predetermined interval of time indicative of the start impulse interval. When light is thus permitted to fall upon the photocell the effect is to bias the grid 247 positively which increases the plate current of tube 245, which in turn renders the grid 258 more negative to thus reduce the plate current of tube 257, hence actuating relay 265 in such manner so as to permit spring 267 to move armature 268 to the dead contact 269 whereupon a spacing impulse will be transmitted over line wire 271 to a remote printer 272. The absence of light upon photocell 240 affects, through the circuit shown in Fig. 16, the relay 265 so that armature 268 is actuated to its right contact 273 thus impressing marking current from battery 274 upon the signal line 271.

Although the present invention is described in connection with certain specific disclosures, it is contemplated that all forms which come within the range and scope of equivalency are intended to be embraced within the purview of the appended claims.

What is claimed is:

1. In a photoelectric start-stop transmitter adapted to be controlled by a strip carrying a plurality of code impressions arranged in transverse rows, means including a single light source, a single optical system, and a single light sensitive device to scan photoelectrically all the impressions in each row in succession, means to transmit under control of the scanning means a complete code signal corresponding to each transverse row, and means to insert start and stop signals in each transmitted code signal.

2. In a photoelectric start-stop transmitter adapted to be controlled by a tape carrying a plurality of rows of code impressions, means to scan photoelectrically one row while the tape is moving from one row to the next row, means to transmit under the control of said scanning means a complete character signal corresponding to each transverse row of code impressions, and means to insert start and stop signals in each character signal.

3. In a photoelectric transmitter adapted to be controlled by a tape having transverse rows of code impressions, a fixed member carrying a series of apertures one corresponding to each impressionable position in the tape, means to control the light conductivity of each aperture by said tape, a fixed member carrying an aperture corresponding to an invariable impulse accompanying every signal, means to scan all apertures in succession, and means to transmit under the control of said scanning means start-stop code signals.

4. In a photoelectric transmitter adapted to be controlled by material carrying code impressions, a scanning device, means to produce relative motion between the material and the scanning device, a fixed member carrying an aperture having a slope corresponding to the traversal of said material during the time intervals allotted to successive impulses, and a rotatable member having a helically arranged series of slots cooperating with said fixed member to control the light conductivity of said code impressions.

5. In a photoelectric transmitter adapted to be controlled by material carrying code perforations, said material being partially light conducting, means to project a beam of light, and a member carrying a slot narrower than the width of the perforations and located a distance from the material on the side away from that on which the beam of light is projected such that substantially the full beam illuminating the slot for active portions falls on the photoelectric cell and due to the scattering effect of the partially transparent material a much smaller portion of the beam illuminating the slot falls upon the photoelectric cell.

6. In a photoelectric transmitter adapted to be controlled by material carrying groups of code impressions, each group representing a character, an exciter lamp, means to scan the groups of impressions by light from said lamp, means to transmit marking and spacing impulses under the control of said scanning means as determined by the groups of impressions, means included as a part of the transmitter to determine within wide limits the value of both marking and spacing impulses independent of the illumination by said lamp, and means for effecting relative movement between said material and said scanning means for the transmission of impulses for a group of impressions.

7. In a photoelectric transmitter adapted to be controlled by material carrying code impressions, a light controlling device comprising a fixed member having a single aperture and a movable member carrying a plurality of apertures, one aperature for each element of the code, and means to photoelectrically transmit impulses under the joint control of the impression material, the fixed member and the movable member.

8. In a photoelectric transmitter adapted to be controlled by material carrying groups of code impressions, each group corresponding to a code signal, a constantly moving scanning device comprising a pair of rotatable nested cylinders, and means to produce relative motions between said cylinders and the material from one group to the next while said cylinders complete a cycle of motion.

9. In a photoelectric transmitter adapted to be controlled by a tape carrying groups of code impressions, each group corresponding to a character signal, a scanning device, means to operate the scanning device in similar cycles for each character signal transmitted, and means independent of the tape and including the scanning device to insert phasing control signals in each character signal transmitted.

10. In a photoelectric transmitter, a rotary scanning device, means controlled by the scanning device to transmit code signals, means to stop the scanning device invariably in the same position, and means to render the stopping means effective at the end of the signals.

11. In a photoelectric transmitter adapted to be controlled by a ribbon carrying transverse rows of code impressions, each row having the same number of possible impression-receiving positions, a member carrying a light limiting slot, means to produce relative motion between the slot and the ribbon, a scanning device, and means to transmit code signals under control of the ribbon and said scanning device, said signals having elementary time intervals corresponding to each possible impression position, said slot being arranged transverse of the length of the ribbon at an angle such that the approximate center of successive impression positions passes the slot at intervals corresponding to the duration of the elements of the signal.

12. In a photoelectric transmitter adapted to be controlled by material carrying code impressions, a scanning member having openings therein invariably assigned to individual elements of a signal, means to cause the impression carrying material to cooperate only with certain of said assigned positions, and means to transmit signals composed of elements corresponding to all said assigned positions, said means effective to insert phasing control elements in each signal transmitted.

13. The method of transmitting signals under control of a ribbon carrying transverse rows of code impressions, each row representing a character signal, which comprises the steps of photoelectrically scanning in succession the rows of impressions during continuous movement of the ribbon, transmitting signals according to the scanning, and automatically inserting phasing signals.

14. In a transmitting device, a constantly rotating shaft, a photoelectric cell, a source of light, a distributing device for successively allowing impingement of said cell by said light source, means to couple the distributing device to the shaft in a predetermined relative phase position, and means to uncouple and arrest the distributing device in a predetermined stopping position.

15. In a photoelectric transmitter, a scanning device comprising a fixed member carrying an aperture, a movable member carrying a plurality of apertures, and an instrumentality adapted to determine the character of the elementary code impulses to be transmitted, means to transmit signals under control of said scanning device, and means to insert photoelectrically phasing impulses in each signal transmitted.

16. In a photoelectric transmitter, a scanning device comprisng a fixed member carrying a plurality of apertures, a movable member carrying a plurality of apertures, and an instrumentality adapted to determine the character of the elementary code impulses to be transmitted, means to transmit signals under control of said scanning device, and means to insert photoelectrically phasing impulses in each signal transmitted.

17. The method of signalling which comprises the steps of assigning a different portion of a light beam to each element of a code, simultaneously presenting all elements of the code to the light beam and blocking portions of the beam, scanning the portions in sequence, and transmitting signals according to the portions blocked.

18. In a transmitter, a single light sensitive device, a scanning device comprising a single optical system, one portion of said scanning device effective to invariably activate said light sensitive device for a portion of each signal to be transmitted, another portion of said scanning device effective to variably activate said light sensitive device according to the signal to be transmitted for another portion of said signal, and means to transmit signals according to the activation of said light sensitive device.

19. In a transmitter, a single light sensitive device, a scanning device comprising a single optical system, means to transmit signals under control of said light sensitive device and said scanning device, and means to associate with the variable portion of each signal an invariable portion through the response of said light sensitive device.

20. In a telegraph system, a scanning device comprising a single optical system, a single photosensitive device, a receiver, means to transmit variable signals under control of said single photosensitive device, means to impart through the action of said device an invariable characteristic to each signal, and means to operate the receiver in unison with the signals under control of the invariable characteristic.

21. In a scanning device for telegraph transmitters, the combination of a pair of rotatable drums arranged in nested relation, one of said drums having a plurality of rows of scanning apertures, said other drum having a helically arranged series of slots corresponding in number to the said plurality of rows of apertures, each of said slots adapted for registry with said scanning apertures.

22. In a photoelectric transmitter, a control form of partially light conducting material and having thereon groups of code impressions less light conducting than the unimpressed material, means including a single photoelectric device and single optical system to photoelectrically scan each group in succession, and means to transmit start-stop code signals under control of the scanning.

23. In a telegraph system, a type printing recorder, a photosensitive device controlled by a form carrying groups of code impressions, each group representing a character signal, and means to transmit independently of the control form an impulse to start the recorder in operation and to transmit other impulses controlled by the photosensitive device according to the impressions.

24. In a signalling device, a photosensitive member, an amplifier controlled by the photosensitive member, means to activate the photosensitive member according to impulses to be transmitted, means to transmit spacing and marking impulses controlled by the amplifier, means in the amplifier and independent of the illumination of the photosensitive member above a predetermined value to determine the value of the current for one kind of impulses, and means to determine the value of the current for other kinds of impulses independent of the illumination of the photosensitive device below a predetermined value.

25. In a signalling device, a photosensitive member, a multi-stage amplifier controlled by the photosensitive member, means to transmit spacing and marking impulses controlled by the amplifier, means to determine the character of the marking impulses by substantially zero plate current in one stage of the amplifier, and means to determine the character of the other kind of impulses by substantially zero plate current in another stage of the amplifier.

26. In a signalling device, a photosensitive member, a multi-stage amplifier controlled by the photosensitive member to generate in its final stage spacing and marking impulses according to the illumination of the photocell, means to produce substantially zero plate current in one stage of the amplifier to correspond to one kind of impulses, and means to produce substantially zero plate current in another stage of the amplifier to correspond to the other kind of impulses.

27. In a signalling device, a photosensitive element, a multi-stage amplifier controlled by said photosensitive element, means to illuminate said photosensitive element according to signals of marking and spacing characteristics to be transmitted, and means to produce substantially zero plate current in at least one stage of the amplifier for signals of either characteristic.

28. In a photoelectric transmitter adapted to be controlled by material carrying code impressions, a scanning device, means to produce relative motion between the material and the scanning device, a fixed member carrying an aperture having a slope the obliquity of which is determined by the distance between the centers of the transverse rows of impressions, and a rotatable member having a helically arranged series of slots cooperating with said fixed member to control the light conductivity of said code impressions.

29. In a photoelectric transmitter adapted to be controlled by material carrying code impressions, a scanning device comprising a cylinder provided with a plurality of helically arranged slots and a fixed member carrying an aperture having a slope the obliquity of which is determined by the distance between the centers of the transverse rows of impressions, and means to produce relative motion between the material and the scanning device, whereby the slots in the cylinder cooperate with only the middle portions of the impressions to accurately define the light intensity so that the intensity of the light remains practically constant throughout each scanning interval.

30. In a photoelectric transmitter adapted to be controlled by perforated tape composed of translucent material, means to project a beam of light, a photoelectric cell, and means comprising spaced apertured bodies for transmitting direct rays of light to said cell and for intercepting diffused rays of light caused by the light scattering effect of said material.

31. In a photoelectric transmitter adapted to transmit an equal unit start-stop permutation code, a light shutter having an opening corresponding to each element of the code, a source of light, a photoelectric cell, means to control the impingement of the light on the photoelectric cell by said shutter, and means to insert through the operation of said photoelectric cell start and stop signals in each code transmitted.

32. In a photoelectric transmitter adapted to transmit an equal unit start-stop permutation code, a light shutter having an opening corresponding to each element of the code, a source of light, a photoelectric cell, and means to control the impingement of the light on the photoelectric cell by said shutter, said means including means for timing the start and stop impulses photoelectrically.

33. In a transmitting apparatus, the combination with a light sensitive device, of means for scanning a perforated tape, said means comprising a pair of rotatable nested cylinders, one of said cylinders having tape engaging instrumentalities serving to control the movement of the tape, and the other cylinder provided with helically arranged apertures serving to sense the perforations sequentially.

34. In a transmitter, a tape provided with transverse rows of perforations, tape sensing means comprising a light source, an optical system, a shutter having a diagonal slot therein, the angularity of the slot being determined by the pitch of the transverse rows of holes in the tape, a drum provided with a helically arranged series of slots corresponding in number to the signal hole positions in the tape, the length of each slot being determinative of the length of signal impulse, a photoelectric cell responsive to the beam of light from said light source, and a circuit controlled by said photoelectric cell.

35. A device for producing current flow in a circuit including a radiant energy element, a first member having a plurality of groups of apertures spaced at equal intervals apart, a second member having a series of slots equal in number to the number of apertures in each group of apertures, said slots being progressively arranged in a definite sequence, and means for rotating said members in the same direction at different speeds to control by means of a perforated tape said element to, in turn, control the flow of current in said circuit.

36. In combination, a telegraph transmitter, means for radiating light, light sensitive means in the path of said light, means located between said light radiating means and said light sensitive means for interrupting said light, said third mentioned means comprising a first cylinder having uniformly spaced rows of perforations in the periphery thereof and a second cylinder fitted within said first cylinder having a plurality of slots progressively arranged in a definite sequence around the periphery, and means to rotate said cylinder at relative speeds in the same direction so that as a control tape is advancing each code position is scanned sequentially to control the impingement of light therethrough upon the light sensitive means.

37. A telegraph transmitter comprising in combination a lamp, a photoelectric cell in the path of the light from said lamp, a pair of nested rotatable drums surrounding said cell and effective between said lamp and said cell, means for feeding a coded control tape over said drums, the outer of said drums having holes in its periphery corresponding to the signal holes in said tape, the inner of said drums having a progressively arranged series of slots in its periphery corresponding in number to the number of elements comprising the code perforated in the tape, and means to rotate said drums so that the inner drum scans each row of perforations upon each revolution.

38. In a transmitter, a pair of nested drums, the outer one of which has parallel rows of perforations therein and the inner one having a series of slots therein in the form of a helix, means for projecting a single stationary spot of light on the wall of said outer drum of conformation sufficient to embrace a longitudinal row of perforations, and means for rotating said inner drum to cause the helically arranged slots therein to traverse sequentially the holes in the longitudinal row of perforations.

39. In a transmitter, a pair of nested drums having apertured peripheries wherein the inner drum rotates a single revolution for each predetermined angular movement of said outer drum, means for projecting an oblong spot of light adapted to embrace a transverse row of perforations in a control tape, means for rotating said drums at relative speeds to sense sequentially the signal holes in said tape, and means to sense invariably once per cycle start and stop positions on said outer drum beyond the limits of said tape.

40. In a transmitter, a pair of nested drums surrounding a photocell the outer drum of which has parallel rows of perforations therein and the inner one having a series of slots therein in the form of a helix, means for projecting a single stationary spot of light on a control tape of conformation sufficient to embrace a transverse row of perforations therein, means for rotating said inner drum to cause the helically arranged slots thereon to sense sequentially the holes in said tape, and means to sense invariably once per cycle start and stop positions on said outer drum beyond the bounds of said tape.

41. In a telegraph transmitter, a light sensitive electrically controlled cell, a pair of nested cylindrically shaped members operatively connected for movement in the same direction at different speeds, each of said members being apertured on their peripheries, the apertures in the inner member being arranged helically, and means operating said inner member to sweep over the apertures of the outer member to control sequentially the impingement of a beam of light on said light sensitive electrically controlled cell.

42. In a transmitting apparatus, a pair of movable and nested cylindrically shaped members having apertures therein arranged for sweeping over a perforated tape, the apertures in the inner member being arranged helically, a light sensitive electrically controlled cell within the inner member, and means for operating said inner member to control sequentially the impingement of a beam of light through said apertures on said light sensitive electrically controlled cell.

43. In a sensing device, the combination of a rotatable drum, having in its periphery a helically arranged series of slots for determining the length of the signal impulses, a light source, a photoelectric cell adapted to respond to the flashes from said light source controlled by a coded control tape, and a circuit comprising a multistage amplifier, controlled by said cell, in which the plate circuit is reduced to zero in at least two places in the multistage amplifier.

44. In a transmitting apparatus, a pair of rotatable drums arranged in nested relation, tape feeding means associated with one of said drums, and a photoelectric cell contained within the inner of said drums, said inner drum being provided with a helically arranged series of apertures to control sequentially the impingement of a beam of light onto said cell as determined by a control tape.

45. In a transmitter, a scanning drum provided with a helically arranged series of apertures, a photoelectric cell contained within said drum, and a tape feeding means independent of said drum and adapted to move a tape a predetermined definite length for each revolution of said drum, the length of the apertures in said drum being determinative of the length of signal impulses by controlling the duration of impingement of a beam of light upon said cell.

46. In a transmitting apparatus, the combination of a pair of drums one located within the other and both rotatable on a common axis, the surface of one drum having tape moving means and a plurality of circumferentially arranged rows of holes, and the surface of the other drum having a helically arranged series of slots adapted to register severally with said rows of holes, and means to rotate said drums at such relative speed that said slots scan sequentially said rows of holes, the length of said slots being determinative of the length of the signal impulses.

47. A transmitting apparatus, comprising in combination a first surface of revolution provided with a plurality of rows of holes each arranged along a generatrix of said surface, a second surface of revolution concentrically disposed with said first surface and provided with a helically arranged series of slots registrable severally with said rows of holes, and means for rotating said surfaces in the same direction at relatively different speeds, such that each hole in each row of holes is sensed once in each revolution of said second surface.

48. In a photoelectric transmitter, a single source of light, a single optical system, a photoelectric device, means for rendering a control strip effective for controlling the action of said device by said light source through said optical system to transmit a code signal indicative of the indicia on the strip, and means independent of the strip for causing said photoelectric device to transmit phasing control conditions.

49. In a photoelectric start-stop transmitter controlled by a strip carrying a plurality of transversely arranged rows of code impressions, means for moving the strip continuously, means to scan the transverse rows of impressions including a device operative in timed relation to the movement of the strip from one transverse row of impressions to the next such row, and means controlled jointly by said device and said strip for determining the character of the transmitted signals.

50. In a photoelectric start-stop transmitter controlled by a strip carrying a plurality of transversely arranged rows of code impressions, means for moving the strip continuously, a drum apertured in accordance with the transverse impressions on the strip, means for rotating said drum whereby its apertures cooperate with the impressions in a transverse row during the period said strip is being moved a distance representative of one character, and means controlled jointly by said drum and said strip for determining the character of the transmitted signals.

51. In a photoelectric start-stop transmitter controlled by a strip carrying a plurality of transversely arranged rows of code impressions, means for moving the strip continuously, a drum apertured in accordance with the transverse impressions on the strip, means for rotating said drum whereby its apertures successively register with the impressions in said strip, and means controlled jointly by said drum and said strip for determining the character of the transmitted signals.

52. In a telegraph transmitter adapted to be controlled by record material carrying signaling indicia arranged in successive rows, means comprising a pair of coaxially related cylinders for scanning the signaling indicia, means for supporting said record material during the scanning of a row of signaling indicia and for advancing the record material to present the successive rows of indicia in a scanning position, a single stationary photosensitive device, and a single stationary exciter lamp, said scanning means constituting the sole means for determining the sequence of scanning.

53. In a photoelectric start-stop transmitter controlled by a strip carrying a plurality of transversely arranged rows of code impressions, a pair of rotatable drums arranged in nested relation, tape feeding means associated with one of said drums for moving the strip continuously, means to scan the transverse rows of impressions including a device operative in timed relation to the movement of the strip from one transverse row of impressions to the next such row, and means controlled jointly by said device and said strip for determining the character of the transmitted signals.

54. In a photoelectric start-stop transmitter adapted to be controlled by a strip carrying a plurality of code impressions arranged in transverse rows, means including a single light source, a single optical system and a single light sensitive device to scan photoelectrically all of the impressions in each row in succession, means to transmit under control of the scanning means a complete code signal corresponding to each transverse row, and means effective independently of the code impressions in said strip to insert start and stop signals in each transmitted code signal.

55. In a photoelectric transmitter adapted to be controlled by material carrying groups of code impressions, each group representing a character, an exciter lamp, means to scan the groups of impressions successively by light from said lamp, means to transmit marking and spacing impulses under the control of said scanning means indicative of each group of impressions, means to determine the value of the current of the marking and spacing impulses independent of the illumination by said lamp above and below predetermined values, and means to present the next group of impressions to said exciter lamp for a succeeding operation.

56. In a photoelectric transmitter adapted to be controlled by material carrying groups of code impressions each group representing a character, an exciter lamp, means to scan the groups of impressions successively by light from said lamp, means to transmit marking and spacing impulses under the control of said scanning means indicative of each group of impressions, electronic means to determine the value of the current of the marking and spacing impulses independent of the illumination by said lamp above and below predetermined values, and means to present the next group of impressions to said exciter lamp for a succeeding operation.

LOUIS M. POTTS.